Nov. 13, 1956 W. L. TENNEY 2,770,226
SPACE HEATER
Filed July 9, 1954

INVENTOR.
WILLIAM L. TENNEY
BY
*Marshal, Biebel, French & Bugg*
ATTORNEYS

United States Patent Office 2,770,226
Patented Nov. 13, 1956

2,770,226

SPACE HEATER

William L. Tenney, Dayton, Ohio

Application July 9, 1954, Serial No. 442,292

5 Claims. (Cl. 123—142.5)

This invention relates to heating systems, and more particularly to a heating system utilizing a pulse jet combustion device as the primary heat source.

The operation of a pulse jet combustion device gives rise to substantial amounts of heat, since the combustion chamber may heat to a glowing orange color and its surface temperature may rise to 1700° F. or higher. The gases within the combustion chamber are correspondingly high in initial temperature, and since they flow at high velocity and in substantial volume out through the discharge tube of the device from the combustion chamber, they heat the wall of the discharge tube to a temperature which may not be as high as that of the combustion chamber but is nevertheless of a high order. The present invention is directed to the conversion of this heat to useful purposes.

The invention is especially applicable to the preheating of piston type internal combustion engines such as truck and tractor engines under conditions of extreme cold existing in Arctic regions and the like. It is commonly necessary under such weather conditions to apply heat to such engine before starting, as from a blow torch or other external source of heat, to raise the lubricant to a fluid consistency and also to warm such associated parts of the engine and battery as necessary for proper starting. This procedure is not only time-consuming and inefficient, but it also creates some fire hazard as well as danger to the operator as the result of exposure to the cold during such warm-up period.

The present invention has for one of its major objects the provision of a heating system for an enclosed space which utilizes a pulse jet combustion device both as the primary source of heat and also as the power source for causing the resulting heated air to circulate through the space to be heated, thus avoiding the necessity for a blower or other circulating device requiring a supplemental power source.

More particularly it is an object of the invention to provide a heating system for an enclosed spaced wherein the heat of operation of a pulse jet combustion device is employed to heat fresh air for circulation through the enclosure to be heated and wherein the discharge velocity of the exhaust gases from the discharge tube of the jet unit is employed as the source of suction to cause the desired circulation of the heated fresh air.

Another object of the invention is to provide a heating system as outlined above which is especially applicable to the preheating of a piston type internal combustion engine by causing circulation of heated fresh air through the crank case of the engine and which is also usable for external heating of other parts of the engine by directing a flow of the hot air which includes the exhaust gases from the jet unit against such other parts of the piston engine as may be desired.

It is also an object of the invention to provide a heating system of the above characteristics wherein the exhaust gases discharged from the discharge tube of a pulse jet device are utilized for preheating of fresh air which is then further heated by passage in intimate contact with the combustion chamber and discharge tube of the jet unit before being caused to circulate through the enclosure to be heated.

Additional objects and advantages of the invention will be apparent from the following description, the accompanying drawings and the appended claims.

In the drawing—

Figure 1:
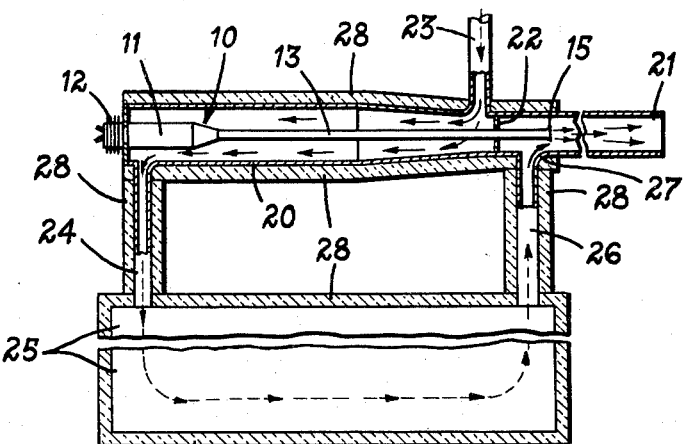
Fig. 1 is a somewhat diagrammatic view illustrating a heating system in accordance with the invention for heating an enclosed space.

Referring to the drawing, which illustrates preferred embodiments of the present invention, a resonant pulse jet combustion device is indicated generally at 10, a device of this type being disclosed in more detail in my Patent No. 2,609,660 issued September 9, 1952. This device 10 is shown as comprising a combustion chamber 11, a fuel and air inlet head 12 at one end of the combustion chamber, and a discharge tube 13 leading from the other end of the combustion chamber to an outlet 15 which may be of belled or flared construction as shown. Since ignition is required only during the starting of a jet device of this type, it may be provided in any suitable way, such as by means of a conventional sparking device as disclosed in detail in my above noted patent. After being started, such a device forms a system resonant in gases which operates with self-induced charging, ignition and scavenging, with the exhaust gases being discharged at high velocity through the discharge tube 13 and its outlet 15, and it will be apparent that any resonant intermittent combustion device may similarly be used.

In accordance with the present invention, the jet unit 10 is enclosed within a jacket 20 which is closed at its end adjacent the combustion chamber and which extends beyond the outlet 15 to an open end 21. A partition 22 is mounted in the jacket at a position spaced relatively closely upstream of the discharge tube 13 from its outlet 15 to leave only a small minor portion of the discharge tube projecting therebeyond. An inlet connection 23 for fresh air opens into the resulting closed interior of the jacket 20 closely adjacent and on the opposite side of the partition 22 from the discharge tube outlet 15, and a supply conduit 24 leads from the closed end of the jacket to one end of the enclosed space to be heated, which is indicated diagrammatically at 25. An exhaust conduit 26 leads from the opposite end of the enclosure 25 and connects with the jacket 20 at a position located between the partition 22 and the outlet 15.

In operation, it will be apparent that the discharge flow of exhaust gases at high velocity from the outlet 15 will have a suction effect on the adjacent outlet end of the exhaust conduit 26. This applied suction will be effective through the enclosure 25 and back through the conduit 24 and the air inlet 23. As a result, fresh air will be caused to flow in through the inlet 23 and to flow in intimate contact with the discharge tube 13 and combustion chamber 11 in such manner as to absorb the very substantial amount of heat radiating therefrom, and this flow is in the direction counter to the flow through the jet unit so that the air progresses towards the hottest part of the unit. This heated air will then continue to flow through the conduit 24, through the enclosure 25 and finally out through the conduit 26 to the discharge end of the jacket 20, and the junction between the conduit 26 and the jacket is preferably curved with an elbow shape as indicated at 27 to promote smooth flow of air therethrough. If desired, these conduits 24 and 26 as well as the jacket 20 and enclosure 25 may be provided with suitable insulating covers 28 to minimize loss of heat to the outside atmosphere.

As stated, the enclosure 25 is shown diagrammatically in Fig. 1 as representing a desired enclosed space to be heated, which may be any space requiring heating by the circulation of heated fresh air uncontaminated by the products of combustion from the jet unit. For example, the enclosure 25 represents a cabin or tent such as might be used by military personnel, or a chamber wherein heating by circulating hot air is desired such for example as a drying room in a paint shop, laundry or the like, or a chamber housing a machine requiring external heating by uncontaminated hot air. It may also represent the crank case of a piston type internal combustion engine as shown in more detail in Fig. 2.

Figure 2:
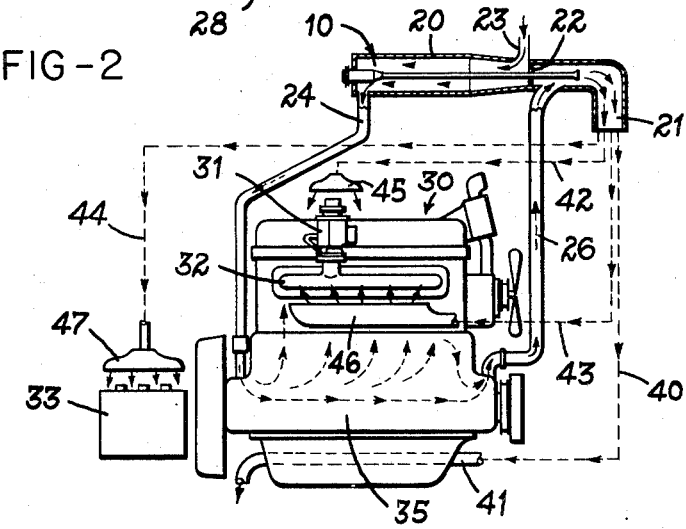
Fig. 2 is a diagrammatic view illustrating the application of the heating system of the invention to the preheating of a piston type internal combustion engine.

Referring to Fig. 2, the heating unit is of essentially the same construction as described in connection with Fig. 1 and includes the pulse jet unit 10 and jacket 20. A piston type engine is indicated generally at 30 and includes a carburetor 31, intake manifold 32, battery 33 and crank case 35. The supply conduit 24 from the jacket 20 leads into one end of the upper portion of the crank case 35, and the exhaust conduit 26 leads from the other end of the crank case to the jacket 20 at the proper location between the partition 22 and the discharge tube outlet 15. This arrangement provides a continuous induced flow of uncontaminated hot air through the crank case 35 to effect the desired preheating of the engine.

Fig. 2 also shows how the heating system may be employed for the external application of heat to the other parts of the engine 30, by directing the discharged hot contaminated air against such parts, namely the mixture of air and the products of combustion which is discharged from the discharge tube 13. For example, one line 40 is shown as leading from the outlet end 21 of the jacket 20 to one or more pipes or tubes 41 extending directly through the sump portion of the crank case 35. The resulting heating of the pipes 41 by the flow of heated gases through these pipes will directly heat the oil in the bottom of the crank case while avoiding contact of any of this contaminated air with the interior of the engine. Similar lines 42, 43, and 44 are shown as leading to outlets 45, 46 and 47 respectively adjacent the carburetor 31, intake manifold 32 and battery 33 for similarly heating these parts. It will of course be apparent that suitable baffles or shrouds may be combined with these outlets if it is desired to shield the parts of the engine being heated from direct contact with the heated gases and/or direct the heated gas flow into localized heating contact with such parts, and also that these parts can be insulated as proved desirable.

Figure 3:
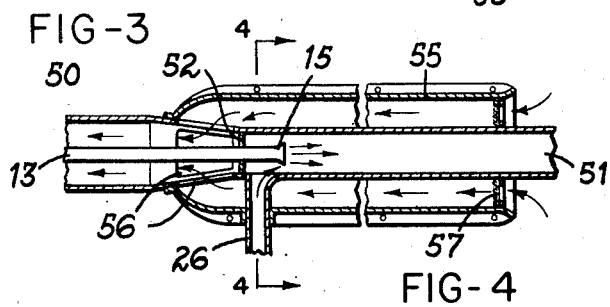
Fig. 3 is an enlarged and fragmentary sectional view illustrating a modified arrangement of the heating system of the invention in which the discharged exhaust gases are utilized for preheating of the air to be further heated by passage over the combustion chamber and discharge tube of the jet unit.
Figure 4:
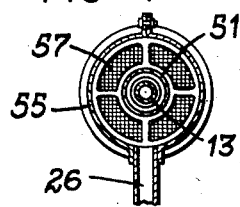
Fig. 4 is a section on the line 4—4 of Fig. 3.

Figs. 3 and 4 show a fragment of a heating system which is essentially the same as described in Fig. 1 and which also is constructed and arranged to utilize the flow of discharge gases through the outer end of the jacket for preheating of the air to be heated. The jacket 50 corresponds to the jacket 20 and encloses the discharge tube 13 of the jet unit and its outlet 15. The discharge end 51 of the jacket is extended beyond the discharge tube outlet, and the partition 52 corresponds to the partition 22. A shroud 55 is mounted in surrounding relation with a portion of the extended discharge end 51 of the jacket, and it connects with the interior of the jacket 50 through a series of slotted openings 56 in the jacket as shown. The outer end of the shroud 55 receives the air from the atmosphere and may be provided with a screen 57 as indicated. It will be apparent that any of the several parts of this heating system may be suitably insulated, as described in connection with Fig. 1.

In operation with the arrangement of Figs. 3 and 4, the flow of air is induced as described in connection with Fig. 1 by the suction effect on the exhaust conduit 26 as the result of the flow of exhaust gases from the outlet 15. Since these gases are still at a substantially elevated temperature, they will heat the portion 51 of the jacket, and the inflowing air through the shroud 55 will absorb some of this heat even before this air reaches the interior of the jacket 50 for contact with the very much hotter discharge tube 13 and the combustion chamber of the jet unit. The remainder of this system will operate in the same manner as described in connection with Fig. 1 to maintain the desired continuous flow of heated air through the enclosure to be heated and ultimately out through the exhaust conduit 26.

Figure 5:
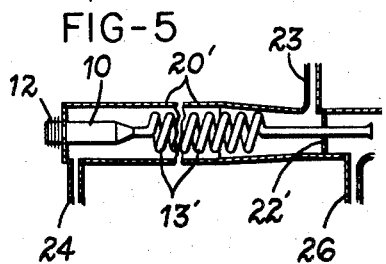
Fig. 5 is a fragmentary diagrammatic view similar to Fig. 1 and showing another form of heating system in accordance with the invention.

The heating systems described above have all been shown with the discharge tube 13 of straight configuration for purposes of simplicity, but the shape of this tube is subject to considerable variation in accordance with the desired installation of the heating system. In particular, the discharge tube can be coiled or otherwise formed on itself for purposes of compactness. Thus Fig. 5 indicates somewhat diagrammatically a heating unit in accordance with the invention in which the jet unit 10 is provided with a discharge tube 13' which is coiled to provide a substantial length of tube in a comparatively short space for inclusion with a correspondingly compact outer jacket 20'. The baffle 22', inlet 23 and conduits 24 and 26 correspond to the similar parts in Fig. 1 and provide for similar operation of this heating system.

It will accordingly be apparent that this invention provides a heating system of great simplicity which at the same time has many useful applications. For example, the jet unit as shown in Fig. 2 is not only of simple and economical construction, but it can be made in such small dimensions as to be readily incorporated within the engine hood of a truck or otherwise directly mounted on a truck, tractor or other apparatus requiring such preheating. Alternatively, this heating unit is of such small size and light weight as to be readily portable for use in preheating a plurality of engine covers or other devices. Also as pointed out, the heating system of the invention has wide application for use as a space heater of living quarters or other enclosed spaces, and for all such uses it provides the additional desirable characteristics of simplicity of operation and maintenance coupled with the fact that it requires no supplemental power source nor auxiliary blower or the like.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A heating system for circulating fresh heated air through an enclosed space, comprising a pulse jet combustion device including a combustion chamber and a discharge tube terminating in an outlet for discharging the exhaust gases from said combustion chamber, a jacket surrounding said combustion chamber and extending beyond said discharge tube outlet, said jacket being closed at the end thereof adjacent said combustion chamber and open at the other end thereof, a partition in said jacket spaced upstream of said discharge tube from said outlet thereof to leave a minor portion of said discharge tube projecting therebeyond, an inlet to the interior of said jacket on the opposite side of said partition from said discharge tube outlet for admitting fresh air to be heated by passage over said discharge tube and combustion chamber, a supply conduit leading from said closed end of said jacket to said enclosed space for conducting the resulting heated air from the interior of said jacket to said enclosed space, and an exhaust conduit leading from said space for conducting air from said space to said jacket and connecting with said jacket at a position between said partition and said discharge tube outlet to cause the discharge flow of exhaust gases from said outlet to induce a flow of said heated air from said jacket through said space and out said exhaust conduit.

2. A heating system for circulating fresh heated air through an enclosed space, comprising a pulse jet combustion device including a combustion chamber and a discharge tube terminating in an outlet for discharging the exhaust gases from said combustion chamber, a jacket surrounding said combustion chamber and extending beyond said discharge tube outlet, said jacket being closed at the end thereof adjacent said combustion chamber and open at the other end thereof, a partition closing the interior of said jacket closely adjacent said outlet of said discharge tube but spaced upstream thereof to leave a minor portion of said discharge tube projecting therebeyond, an inlet to said closed interior of said jacket adjacent said partition for admitting fresh air to be heated by passage over said discharge tube and combustion chamber in the direction counter to the flow of said exhaust gases, a supply conduit leading from said closed end of said jacket to said enclosed space for conducting the resulting heated air from the interior of said jacket to said enclosed space, and an exhaust conduit leading from said space for conducting air from said space to said jacket and connecting with said jacket at a position between said partition and said discharge tube outlet to cause the discharge flow of exhaust gases from said outlet to induce a flow of said heated air from said jacket through said space and out said exhaust conduit.

3. A heating system for circulating fresh heated air through an enclosed space, comprising a pulse jet combustion device including a combustion chamber and a discharge tube terminating in an outlet for discharging the exhaust gases from said combustion chamber, a jacket surrounding said combustion chamber and extending beyond said discharge tube, said jacket being closed at the end thereof adjacent said combustion chamber and open at the other end thereof, a partition in said jacket spaced upstream of said discharge tube from said outlet thereof to leave a minor portion of said discharge tube projecting therebeyond, an inlet to the interior of said jacket on the opposite side of said partition from said discharge tube outlet for admitting fresh air to be heated by passage over said discharge tube and combustion chamber, said inlet including a shroud at least partially surrounding a portion of said jacket extending beyond said discharge tube and heated by passage of said exhaust gases therethrough to effect preheating of said fresh air by passage over said heated jacket portion, a supply conduit leading from said closed end of said jacket to said enclosed space for conducting the resulting heated air from the interior of said jacket to said enclosed space, and an exhaust conduit leading from said space for conducting air from said space to said jacket and connecting with said jacket at a position between said partition and said discharge tube outlet to cause the discharge flow of exhaust gases from said outlet to induce a flow of said heated air from said jacket through said space and out said exhaust conduit.

4. A preheating system for circulating uncontaminated heated air through the crank case of an internal combustion engine, comprising a pulse jet combustion device including a combustion chamber and a discharge tube terminating in an outlet for discharging the exhaust gases from said combustion chamber, a jacket surrounding said combustion chamber and extending beyond said discharge tube outlet, said jacket being closed at the end thereof adjacent said combustion chamber and open at the other end thereof, a partition in said jacket spaced upstream of said discharge tube from said outlet thereof to leave a minor portion of said discharge tube projecting therebeyond, an inlet to the interior of said jacket on the opposite side of said partition from said discharge tube outlet for admitting fresh air to be heated by passage over said discharge tube and combustion chamber, a supply conduit leading from said closed end of said jacket to one end of said crank case for conducting the resulting heated air from the interior of said jacket to said crank case, and an exhaust conduit leading from the opposite end of said crank case for conducting air from said crank case to said jacket and connecting with said jacket at a position between said partition and said discharge tube outlet to cause the discharge flow of exhaust gases from said outlet to induce a flow of said heated air from said jacket through said crank case and out said exhaust conduit.

5. A preheating system for circulating uncontaminated heated air through the crank case of an internal combustion engine, comprising a pulse jet combustion device including a combustion chamber and a discharge tube terminating in an outlet for discharging the exhaust gases from said combustion chamber, a jacket surrounding said combustion chamber and extending beyond said discharge tube outlet, said jacket being closed at the end thereof adjacent said combustion chamber and open at the other end thereof, a partition in said jacket spaced upstream of said discharge tube from said outlet thereof to leave a minor portion of said discharge tube projecting therebeyond, an inlet to the interior of said jacket on the opposite side of said partition from said discharge tube outlet for admitting fresh air to be heated by passage over said discharge tube and combustion chamber, a supply conduit leading from said closed end of said jacket to one end of said crank case for conducting the resulting heated air from the interior of said jacket to said crank case, an exhaust conduit leading from the opposite end of said crank case for conducting air from said crank case to said jacket and connecting with said jacket at a position between said partition and said discharge tube outlet to cause the discharge flow of exhaust gases from said outlet to induce a flow of said heated air from said jacket through said crank case and out said exhaust conduit, and means for conducting said exhaust gases from said open end of said jacket to the exterior of other parts of said internal combustion engine for preheating the same.

References Cited in the file of this patent
UNITED STATES PATENTS

| | | |
|---|---|---|
| 1,389,109 | Weston | Aug. 30, 1921 |
| 1,789,560 | Moore | Jan. 20, 1931 |
| 2,418,097 | Ruff | Mar. 25, 1947 |
| 2,643,107 | Kamm et al. | June 23, 1953 |